United States Patent
Oeda et al.

(10) Patent No.: US 6,549,236 B2
(45) Date of Patent: *Apr. 15, 2003

(54) IMAGE REPRODUCTION APPARATUS WITH MULTIPLE-SCREEN DISPLAY MODE

(75) Inventors: Hideshi Oeda, Osaka (JP); Masahiro Shioji, Osaka (JP); Hideki Toyoda, Osaka (JP); Masaru Higashide, Osaka (JP)

(73) Assignee: Sanyo Electric Co., Ltd., Moriguchi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,462

(22) Filed: Feb. 24, 1998

(65) Prior Publication Data

US 2002/0067420 A1 Jun. 6, 2002

(30) Foreign Application Priority Data

Feb. 24, 1997 (JP) .............................................. 9-039003

(51) Int. Cl.⁷ .......................... H04N 5/222; H04N 5/225
(52) U.S. Cl. ................... 348/333.05; 348/376; 396/374
(58) Field of Search ................................ 396/373, 374; 386/1, 8, 40, 109, 112, 120, 121; 382/296, 299; 358/443, 450, 451, 906, 909.1; 345/326, 328, 342, 501; 348/207, 222, 231–233, 333, 334, 563, 564, 588; H04N 5/228, 5/76, 5/222

(56) References Cited

U.S. PATENT DOCUMENTS

| | | | | |
|---|---|---|---|---|
| 5,164,831 A | * | 11/1992 | Kuchta | 348/233 |
| 5,414,811 A | * | 5/1995 | Parulski | 345/501 |
| 5,500,743 A | * | 3/1996 | Sakaegi | 358/450 |
| 5,576,759 A | * | 11/1996 | Kawamura | 348/231 |
| 5,635,984 A | * | 6/1997 | Lee | 348/333 |
| 5,796,428 A | * | 8/1998 | Matsumoto | 348/231 |
| 5,861,918 A | * | 1/1999 | Anderson | 348/233 |
| 5,917,488 A | * | 6/1999 | Anderson | 345/342 |
| 5,963,204 A | * | 10/1999 | Ikeda | 345/723 |
| 6,020,920 A | * | 2/2000 | Anderson | 348/222 |
| 6,097,431 A | * | 8/2000 | Anderson | 348/233 |
| 6,147,703 A | * | 11/2000 | Miller | 348/220 |

FOREIGN PATENT DOCUMENTS

| | | |
|---|---|---|
| JP | 5-56382 | 3/1993 |
| JP | 7-143426 | 6/1995 |

OTHER PUBLICATIONS

Foreign Office Action for Japanese Patent Application No. 9–039003 dated Nov. 26, 2002.

* cited by examiner

*Primary Examiner*—Ngoc-Yen Vu
(74) *Attorney, Agent, or Firm*—Armstrong, Westerman & Hattori, LLP

(57) ABSTRACT

A digital still camera has an image memory for storing a plurality of image groups. Each image group includes nine normal images and a reduced image obtained by thinning pixels of each normal image for reduction to 1/9. When a mode pattern is pressed to indicate forward/backward screen-feeding in a nine-screen multi-reproduction mode, a control circuit feeds forwards or backwards nine reduced images displayed on a liquid crystal screen for each group at one time. Images can thus be retrieved more rapidly than in conventional examples which require operating a forward/backward screen-feed button nine times to feed nine reduced images forwards or backwards.

4 Claims, 6 Drawing Sheets

IMAGE REPRODUCTION APPARATUS WITH MULTIPLE-SCREEN DISPLAY MODE

BACKGROUND OF THE INVENTION

1. Field of the Invention

The present invention relates to an image reproduction apparatus, and more specifically to an image reproduction apparatus with a single-screen display mode for displaying a single normal image on an entire display screen and a multiple-image display mode for dividing the display screen into a plurality of screens and displaying a reduced image on each divided screen.

2. Description of the Related Art

Digital still cameras have been conventionally provided with a multiple-(e.g. nine-)screen multi-reproduction mode for retrieving a desired image from a plurality of images recorded in an image memory incorporated therein.

In the nine-screen multi-reproduction mode, as shown in FIG. 6A, a monitoring liquid crystal screen 50 of a still camera is divided into nine screens in three rows and three columns and nine reduced images P1'–P9', the contents of which are represented by the letters A-I in the figure, read from an image memory are respectively displayed on the nine divided screens. Reduced images P1'–P9' have image numbers 1–9 displayed at their respective lower right portions and a selection mark M is displayed in any reduced image (P1' in the figure) of reduced images P1'–P9'.

Selection mark M can be moved by one divided screen, by operating a forward/backward screen-feed button (not shown). For example, when the forward/backward screen-feed button is pressed at the forward feed side twice in the state shown in FIG. 6A, selection mark M moves to reduced image P3', and when it is pressed once more, selection mark M moves to reduced image P4' in the second row. When the forward/backward screen-feed button is pressed at the forward feed side nine times in the original state, reduced images P1'–P9' disappear so that another group of reduced images P10'–P18', the contents of which are represented by the letters J-R in FIG. 6B, are displayed and selection mark M is displayed in reduced image P10' in the first row and column, as shown in the figure.

When selection mark M is placed in a desired reduced image (e.g. P14') and a setting button (not shown) is pressed, reduced image P14' is enlarged and displayed on an entire liquid crystal screen 10. It should be noted that selection mark M and the image number are manually or automatically erased from screen 50.

However, the nine-screen multi-reproduction mode of the conventional still camera is time-consuming in image retrieval, since the nine reduced images P1'–P9' displayed on liquid crystal screen 50 are replaced with the subsequent group of reduced images P10'–P18' by operating the forward/backward screen-feed button nine times.

A main object of the present invention is therefore to provide an image reproduction apparatus capable of rapid image retrieval.

SUMMARY OF THE INVENTION

Briefly summarizing the present invention, a storage device stores a plurality of image groups each including first to Nth reduced images and a normal image corresponding to each reduced image, a multiple-image reading portion reads and displays the first to Nth reduced images of an image group on first to Nth divided screens, respectively, and a portion feeding multiple images forwards/backwards controls the multiple-image reading portion to read the first to Nth reduced images of the group subsequent or prior to a group. Thus, the reduced images on the first to Nth divided screen can be fed forwards or backwards at one time and the images stored in the storage device can be retrieved rapidly.

Preferably, the present invention also includes an image selecting portion for selecting a desired reduced image from the first to Nth divided screens and a single-image reading portion for reading from the storage device a normal image corresponding to a reduced image selected by the image selecting portion and displaying the normal image on the entire display screen so that a desired reduced image displayed on a divided screen can be enlarged and displayed on the entire display screen.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1A:
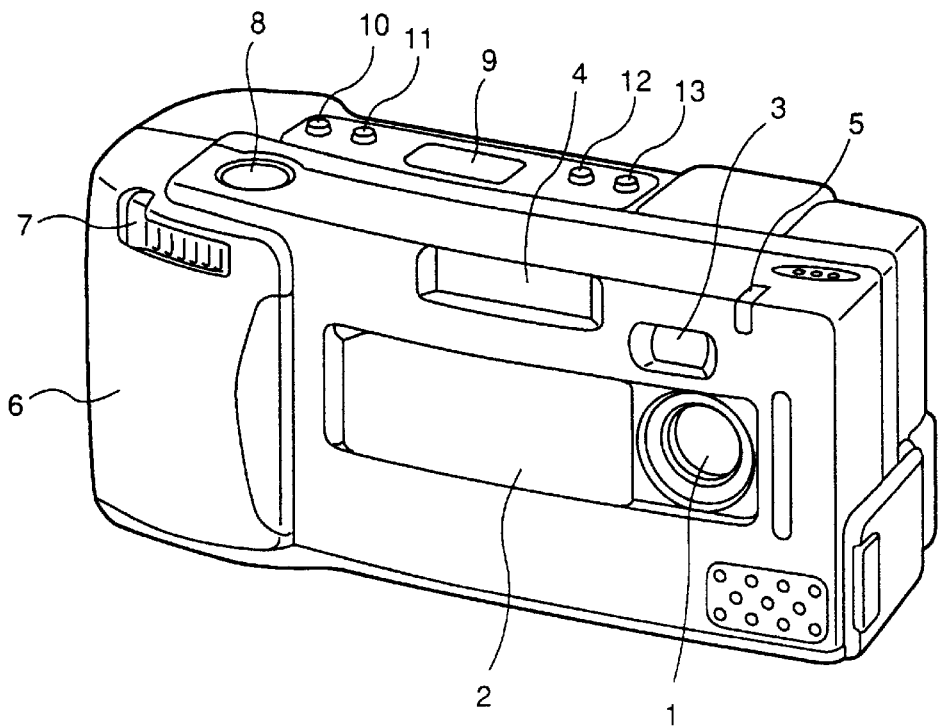
FIGS. 1A and 1B are perspective views of the outer appearance of a digital still camera according to an embodiment of the present invention.
Figure 1B:
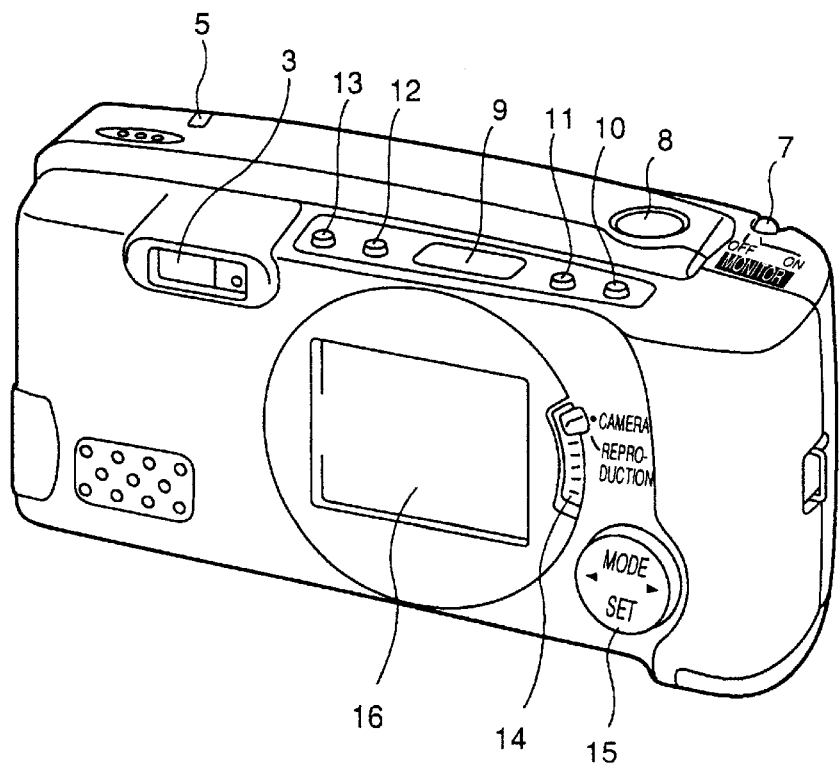
Figure 2A:
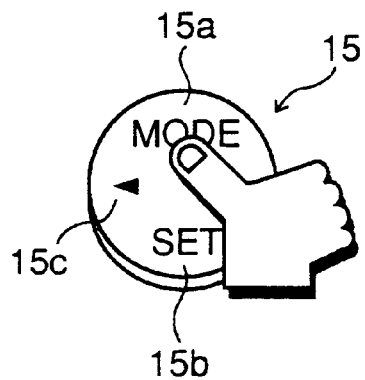
FIGS. 2A–2D show a method of operating a mode button of the digital still camera shown in FIGS. 1A and 1B and a configuration thereof.
Figure 2B:
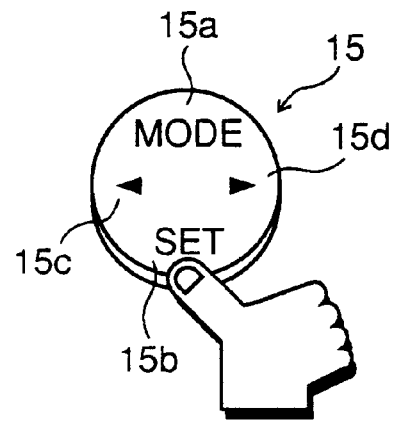
Figure 2C:
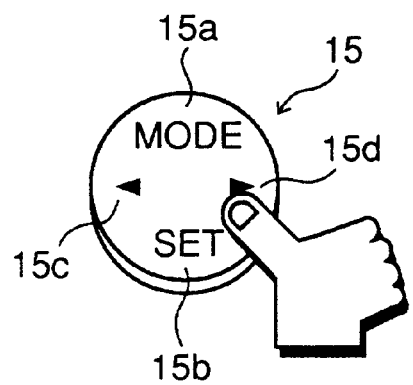
Figure 2D:
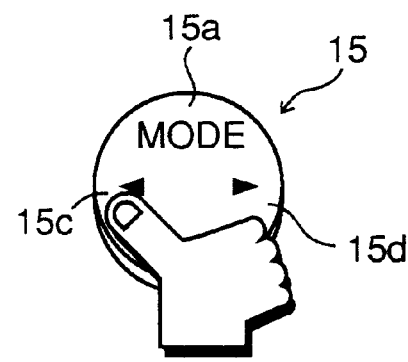

FIGS. 1A and 1B are perspective views of the outer appearance of a digital still camera according to one embodiment of the present invention, seen from the front side (the lens side) and the rear side, respectively.

Referring to FIGS. 1A and 1B, provided at the front side of the still camera are a lens 1, a lens cover 2, a finder 3, a flush emitting portion 4 and a self-timer lamp 5, and a grip 6 is provided with a monitor switch 7. A shutter button 8, a control panel 9 and various buttons 10–13 are provided at the upper side of the still camera, and a camera/reproduction switch 14, a mode button 15 and a monitoring liquid crystal screen 16 at the rear side thereof. Control panel 9 displays how many more images can be taken, the amount of electric charge remaining in the battery, and the like. When camera/reproduction switch 14 is set at the CAMERA side, the camera can be used in a similar manner to typical cameras of silver salt type and can thus pick up images which are then successively stored in an incorporated image memory. When camera/reproduction switch 14 is set at the REPRODUCTION side and monitor switch 7 is switched on, an image stored in the image memory can be displayed on liquid crystal screen 16.

Mode button 15 is a button which provides four functions. Mode selection, mode setting, forward screen-feeding, and backward screen-feeding can be provided by lightly pressing down mode button 15 circumferentially at a MODE portion 15a, a SET portion 15b, a forward screen-feed portion 15c and a backward screen-feed portion 15d outwards, respectively, as shown in FIGS. 2A–2D.

Figure 3:
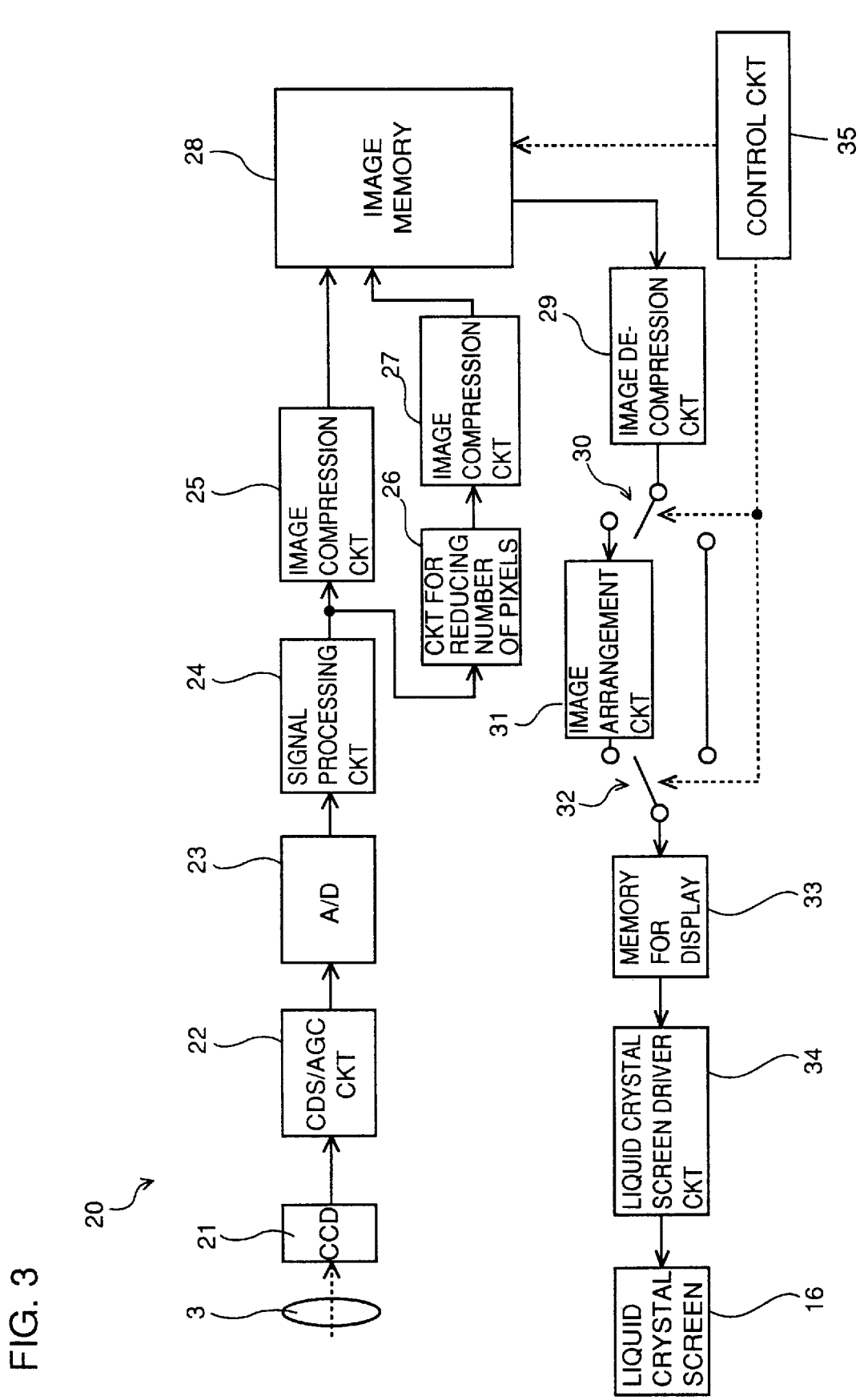
FIG. 3 is a block circuit diagram showing a configuration of an image recording and reproduction circuit of the digital still camera shown in FIGS. 1A and 1B.

FIG. 3 is a block circuit diagram showing a configuration of an image recording and reproduction circuit 20 incorporated in the still camera.

Referring to FIG. 3, image recording and reproduction circuit 20 includes a CCD 21, a CDS (corrected double sampling)/AGC circuit 22, an A-D converter 23, a signal processing circuit 24, an image compression circuits 25 and 27, a circuit 26 reducing the number of pixels, and an image memory 28.

CCD 21 converts the light incident via lens 3 into an analog, electrical signal. CDS/AGC circuit 22 samples the output signal of CCD 21 and adjusts the level of the output signal of CCD 21 to produce an analog video signal. A-D converter 23 converts the analog video signal produced at CDS/AGC circuit 22 into digital image data. Signal processing circuit 24 applies a processing for generating three color signals, i.e. R, G and B signals and Y, U and V signals, to the image data produced at A-D converter 23.

Image compression circuit 25 compresses the image data processed at signal processing circuit 24 and stores the compressed data into image memory 28. Image compression circuit 25 provides an image compression in accordance with e.g. a JPEG standard in which 8×8 pixels are assumed to be as one block and each block is subjected to two-dimensional discrete cosine transform (DCT), quantization and two-dimensional Haffman coding as a series of processings.

In circuit 26 reducing the number of pixels, the image data produced at signal processing circuit 24 is thinned to one ninth so that reduced image data is produced for nine-screen multi-reproduction. Image compression circuit 27 compresses the reduced image data produced at circuit 26 reducing the number of pixels and stores the compressed data into image memory 28.

Figure 4:
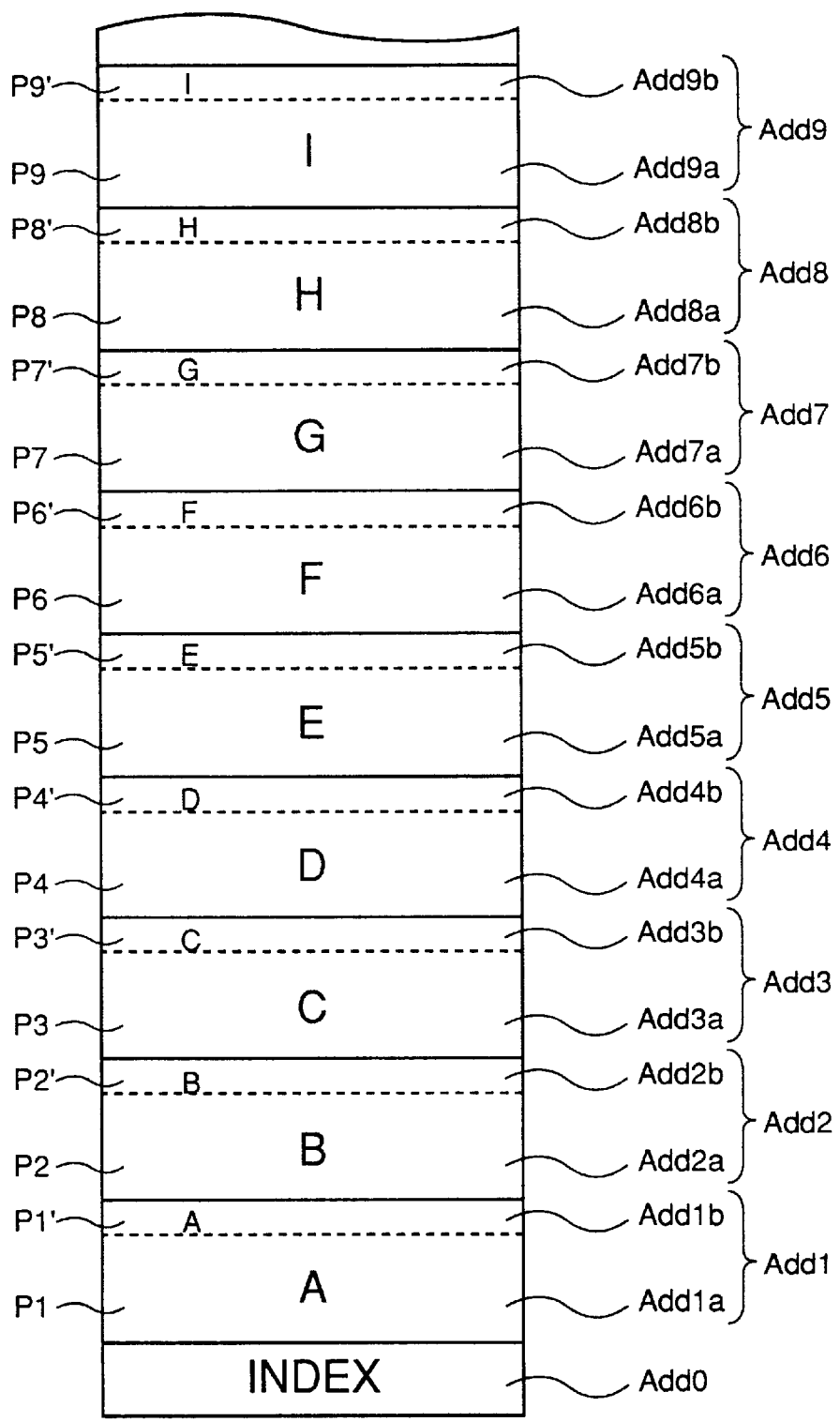
FIG. 4 shows an address map of the image memory shown in FIG. 3.

As shown in FIG. 4, image memory 28 assigns one address for one group consisting of nine images and the address is divided into an index address Add0 for identifying the group and addresses Add1–Add9 for the nine images. Each of addresses Add1–Add9 is further divided into addresses Add1a-Add9a for storing image data produced at image compression circuit 25 and addresses Add1b-Add9b for storing reduced image data produced at image compression circuit 27. In other words, images P1–P9 for single-screen display are respectively stored at addresses Add1a-Add9a and reduced images P1'–P9' for nine-screen display are respectively stored at addresses Add1b-Add9b.

Image recording and reproduction circuit 20 also includes an image decompression circuit 29, switches 30 and 32, an image arrangement circuit 31, a memory 33 for display, a liquid crystal screen driver circuit 34, and a control circuit 35. Image decompression circuit 29 decompresses compressed image data read from image memory 28 according to the JPEG standard to obtain the original image data or the reduced image-data. Switches 30 and 32 are controlled by control circuit 35 to provide the image data from image decompression circuit 29 directly to memory 33 for display or provide the reduced image from image decompression circuit 29 via image arrangement circuit 31 to memory 33 for display.

Image arrangement circuit 31 successively arranges reduced image data successively transmitted from image decompression circuit 29 in memory space of memory 33 for display to form one image consisting of nine reduced images. Memory 33 for display has memory space corresponding to liquid crystal screen 16 and stores image data by one screen that is provided from image decompression circuit 29 or image arrangement circuit 31. Liquid crystal screen driver circuit 34 drives liquid crystal screen 16 according to image data stored in memory 33 for display to display the image on liquid crystal screen 16. Control circuit 35 controls image memory 28, switches 30 and 32 and the like in response to signals from camera/reproduction device 14, mode button 15 and the like shown in FIG. 1.

Figure 5:
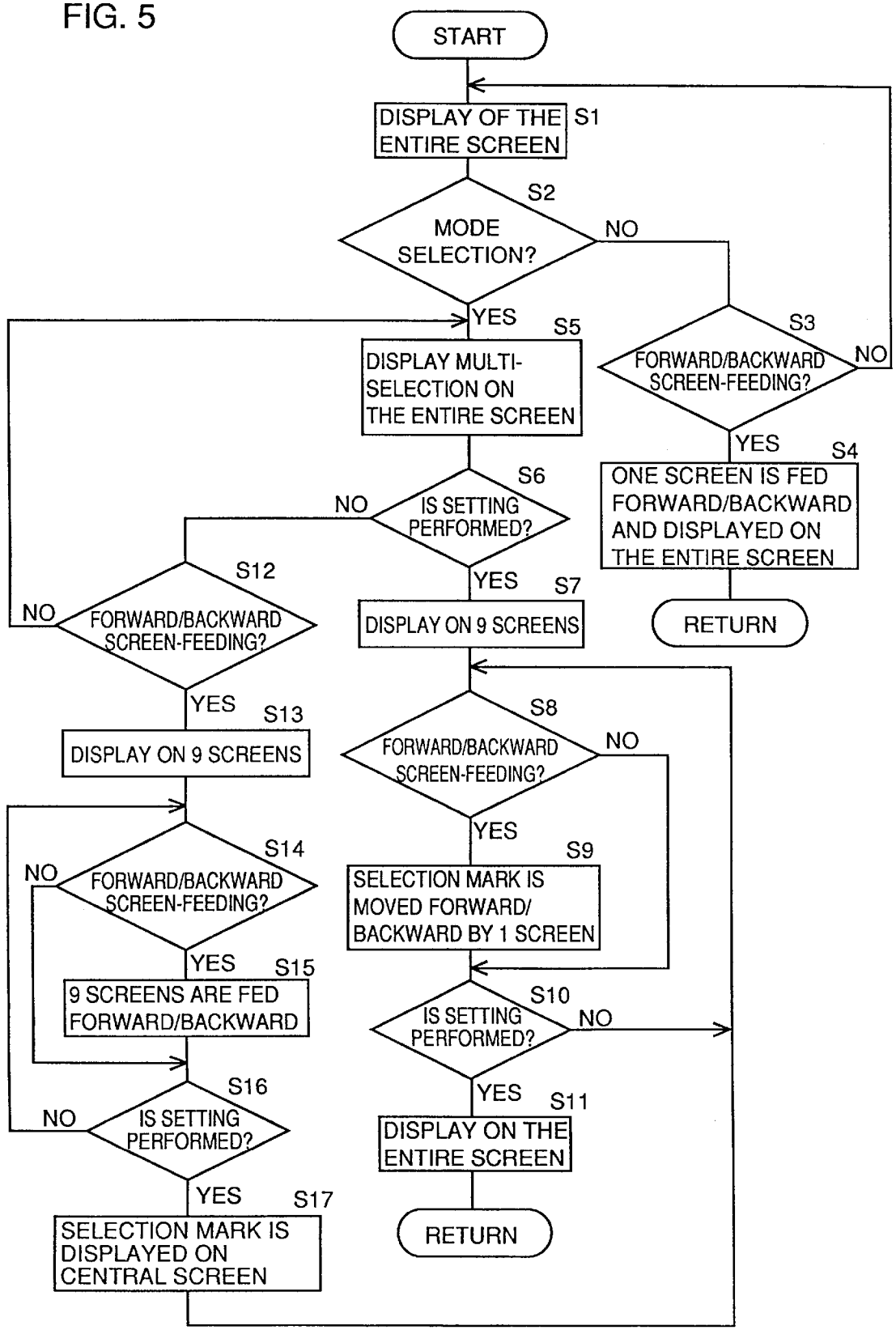
FIG. 5 is a flow chart representing an operation of the FIGS. 1A and 1B digital still camera in a reproduction mode.
Figure 6A:
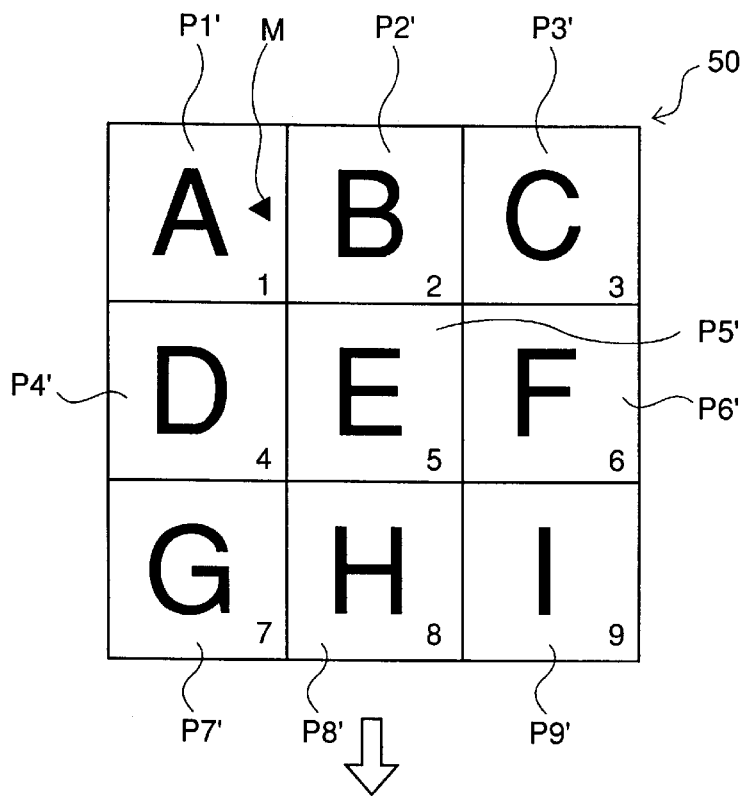
FIGS. 6A and 6B are views for describing a disadvantage of the nine-screen multi-reproduction mode of a conventional digital still camera.
Figure 6B:
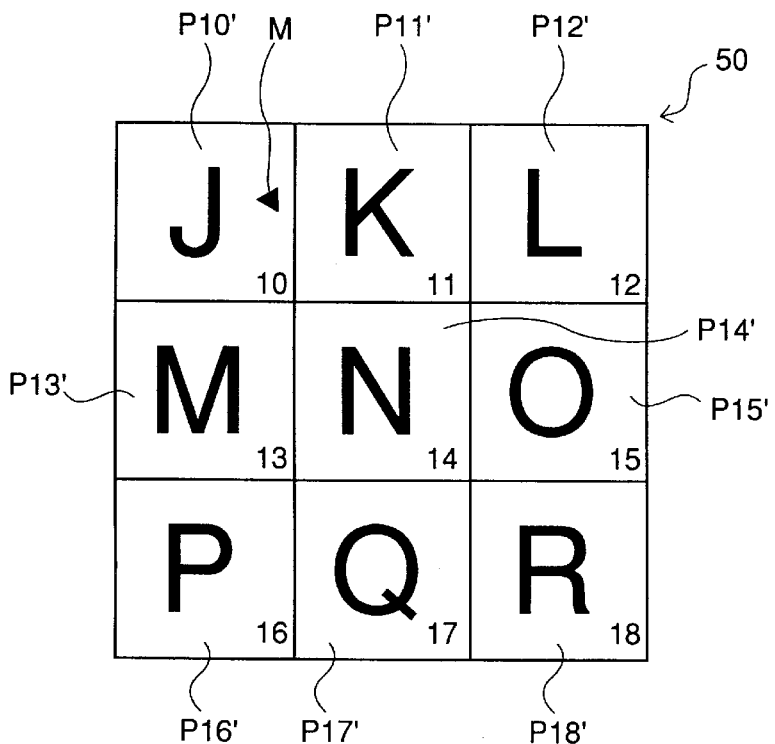

FIG. 5 is a flow chart representing an operation of control circuit 35 in the reproduction mode. An operation of the still camera in the reproduction mode shown in FIGS. 1A–4 will now be described with reference to this flow chart.

When camera/reproduction switch 14 is set at the REPRODUCTION side to set the reproduction mode and monitor switch 7 is switched on, control circuit 35 controls switches 30 and 32 to directly connect image decompression circuit 29 and memory 33 for display and also reads image data from image memory 28 and displays an image on the entire liquid crystal screen 16 in step S1. It should be noted that an image may be an image stored at the first address of image memory 28 or an image which has previously been reproduced.

In step S2, control circuit 35 determines whether mode button 15 is pressed to provide mode selection. If mode selection is not made in step S2, control circuit 35 determines in step S3 whether mode button 15 is pressed to indicate forward/backward screen-feeding. If forward/backward screen-feeding is indicated, one screen is fed forward or backward and displayed on the entire screen in step S4. If forward/backward screen-feeding is not indicated, control returns to step S1.

If mode selection is performed in step S2, multi-selection mark is displayed on liquid crystal screen 16 in step S5. In step S6, control circuit 35 determines whether mode button 15 is pressed at the SET portion 15b to perform setting. If control circuit 35 determines that the setting has been performed in step S6, control circuit 35 controls the FIG. 3 switches 30 and 32 in step S7 to connect image arrangement circuit 31 between image decompression circuit 29 and memory 33 for display and also reads reduced image data of a group from image memory 38 to display nine reduced images (e.g., P1'–P9') on display screen 16.

In step S8, control circuit 35 determines whether mode button 15 is pressed to indicate forward/backward screen-feeding. If control circuit 35 determines that forward/backward screen-feeding has been indicated, selection mark M on liquid crystal screen 16 is sent forward or backward by one divided screen and then control goes to step S10. If control circuit 35 determines that forward/backward screen-feeding has not been indicated, control goes directly to step S10. In step S10, control circuit 35 determines whether mode button 15 is pressed at the SET portion 15b to perform setting. If the setting is not performed, control goes back to step S8. If the setting is performed in step S10, control circuit 35 controls switches 30 and 32 in step S11 to directly connect image decompression circuit 29 and memory 33 for display and also reads from image memory 28 an image (e.g., P5) corresponding to a reduced image (P5' in this case) with selection mark M placed therein to display the image on liquid crystal screen 16.

If setting is not performed in step S6, control circuit 35 determines in step S12 whether mode button 15 is pressed to indicate forward/backward screen-feeding. If it is not indicated, control goes back to step S5. If forward/backward screen-feeding is indicated in step S12, control circuit 35 controls switches 30 and 32 to connect image arrangement circuit 31 between image decompression circuit 29 and memory 33 for display and also reads nine reduced images (e.g. P1'–P9') of a group from image memory 28 to display them on liquid crystal screen 16 in step S13. At this point, selection mark M is not displayed on liquid crystal screen 16.

In step S14, control circuit 35 determines whether mode button 15 is pressed to indicate forward/backward screen-feeding. If it is indicated, nine reduced images of a group immediately subsequent to the current group or immediately previous to the current group (the last group in this case) are read and displayed on liquid crystal screen 16 and control then goes to step S16. If forward /backward screen-feeding is not indicated, control goes directly to step S16. In other words, nine reduced images can be fed forward or backward at one time in one operation of mode button 15.

In step S16, control circuit 35 determines whether the SET portion 15b of mode button 15 is pressed to perform setting. If the setting is not performed, control goes back to step S14. If it is performed, selection mark M is displayed in the central screen among divided screens in step S17 and control then returns to step S8. Then, mode button 15 can be operated so that selection mark M is moved to a desired reduced image and is set to enlarge and display the reduced image on the entire liquid crystal screen 16.

Since the present embodiment is provided with a mode for feeding all the nine reduced images forward/backward (i.e., steps S12–S17), nine reduced images can be fed forward or backward by operating a button once and images can be retrieved more rapidly than in conventional examples which require operating the button nine times for feeding nine reduced images forward or backward.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reproduction apparatus with a single-screen display mode for displaying a single normal image on the entirety of a display screen and a multiple-screen display mode for dividing said display screen into N and displaying on each divided screen a reduced image obtained by thinning pixels of the normal image, wherein N represents a natural number greater than one, comprising;
    a memory for storing, before said single-screen display mode and said multiple-screen display mode are indicated, a plurality of image groups each including first to Nth reduced images and a normal image corresponding to each reduced image;
    a multiple-image reader responsive to indication of said multiple-screen display mode for reading and displaying the first to Nth reduced images of an image group from said memory on first to Nth divided screens, respectively;
    a feeder for feeding multiple images forward/backward controlling said multipler-image reader to read the first to Nth reduced images of an image group subsequent or prior to said image group, for feeding reduced images on said first to Nth divided screens forward and backward at one time;
    an image selector for selecting a desired reduced image from the first to Nth reduced images displayed on said first to Nth divided screens; and
    a single-image reader for reading from said memory and displaying on the entirety of display screen a normal image corresponding to the reduced image selected by said image selector;
    wherein, said image selector includes:
    a mark display portion displaying a selection mark on a center, divided screen of said first to Nth divided screens together with a reduced image; and
    a button for moving said selection mark to a divided screen having a desired reduced image displayed thereon, and determining selecting a reduced image displayed together with said selection mark.

2. The apparatus of claim 1, wherein said mark display portion displays said selection mark in response to a fact that said feeder has selected a desired image group.

3. An image recording and reproducing apparatus with a single-screen display mode for displaying a single normal image on the entirety of a display screen and a multiple-screen display mode for dividing said display screen into N and displaying on each divided screen a reduced image obtained by thinning pixels of the normal image, wherein N represents a natural number greater than one, comprising:
    an imaging portion taking an image;
    a memory storing an image;
    an image writer configuring a plurality of image groups each including first to Nth reduced images and a normal image corresponding to each reduced image, writing to said memory an image taken by said imaging portion and a reduced version of the image taken by said imaging portion;
    a multiple-image reader responsive to indication of said multiple-screen display mode for reading and displaying the first to Nth reduced images of an image group from said memory on first to Nth divided screens, respectively;
    a feeder for feeding multiple images forward/backward controlling said multiple-image reader to read the first to Nth reduced images of an image group subsequent or prior to said image group, for feeding reduced images on said first to Nth divided screens forwarded or backward at one time;
    an image selector for selecting a desired reduced image from the first to Nth reduced images displayed on said first to Nth divided screens; and
    a single-image reader for reading from said memory and displaying on the entirety of display screen a normal image corresponding to the reduced image selection by said image selector;
    wherein, said image selector includes:
    a mark display portion displaying a selection mark on a center, divided screen of said first to Nth divided screens together with a reduced image: and
    a button for moving said selection mark to a divided screen having a desired reduced image displayed thereon, and determining selecting a reduced image displayed together with said selection mark.

4. The apparatus of claim 3, wherein said mark display portion displays said selection mark in response to a fact that said feeder has selected a desired image group.

* * * * *